(12) United States Patent
Koval et al.

(10) Patent No.: US 9,914,348 B2
(45) Date of Patent: Mar. 13, 2018

(54) ELECTRIC DRIVE MOTOR ASSEMBLY FOR A WHEEL

(71) Applicant: Nissan North America, Inc., Franklin, TN (US)

(72) Inventors: Barry Koval, Phoenix, AZ (US); Benjamin Bowlby, Zionsville, IN (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 469 days.

(21) Appl. No.: 14/319,947

(22) Filed: Jun. 30, 2014

(65) Prior Publication Data

US 2015/0375613 A1 Dec. 31, 2015

(51) Int. Cl.
*B60K 17/356* (2006.01)
*B60K 7/00* (2006.01)
*B60K 17/04* (2006.01)

(52) U.S. Cl.
CPC .......... *B60K 7/0007* (2013.01); *B60K 17/356* (2013.01); *B60K 17/043* (2013.01); *B60K 17/046* (2013.01); *B60K 2007/0038* (2013.01); *B60K 2007/0053* (2013.01); *B60K 2007/0061* (2013.01); *B60K 2007/0092* (2013.01)

(58) Field of Classification Search
CPC .......... B60K 2007/0038; B60K 7/0007; B60K 17/356
USPC ......................................................... 180/242
See application file for complete search history.

(56) References Cited

U.S. PATENT DOCUMENTS

| | | | | |
|---|---|---|---|---|
| 5,067,932 A * | 11/1991 | Edwards | ................ | B60K 6/105 |
| | | | | 180/65.51 |
| 7,306,065 B2 | 12/2007 | Nagaya | | |
| 7,350,605 B2 | 4/2008 | Mizutani et al. | | |
| 8,746,383 B2 * | 6/2014 | Basadzishvili | .......... | B60G 3/01 |
| | | | | 180/65.51 |
| 9,440,531 B2 * | 9/2016 | Fischer | .................... | B60K 6/52 |
| 2004/0094928 A1 * | 5/2004 | Amanuma | ................ | B60G 3/20 |
| | | | | 280/124.125 |
| 2005/0029026 A1 * | 2/2005 | Heinen | ................ | B60K 7/0007 |
| | | | | 180/65.51 |
| 2007/0247001 A1 * | 10/2007 | Nakano | ................. | B60W 20/15 |
| | | | | 303/157 |
| 2008/0236908 A1 * | 10/2008 | Cooper | ................ | B60K 17/046 |
| | | | | 180/65.1 |
| 2009/0133944 A1 * | 5/2009 | Nishioka | ................... | B60G 3/20 |
| | | | | 180/65.51 |
| 2010/0155168 A1 * | 6/2010 | Mies | ....................... | B60G 7/001 |
| | | | | 180/300 |
| 2010/0331093 A1 * | 12/2010 | Ozawa | .................... | B60B 27/00 |
| | | | | 464/139 |

(Continued)

FOREIGN PATENT DOCUMENTS

EP 1961602 A1 8/2008
JP 2012-201343 A 10/2012
JP 2013-39902 A 2/2013

*Primary Examiner* — Joseph M Rocca
*Assistant Examiner* — Conan D Duda
(74) *Attorney, Agent, or Firm* — Global IP Counselors, LLP (57) ABSTRACT

An electric drive motor assembly for a wheel includes a wheel hub and an electric motor configured to drive the wheel hub. A drive shaft connects the wheel hub to the electric motor. A pivot member is pivotally connected to the electric motor such that the electric motor is rotatable about the pivot member to accommodate movement of the wheel hub.

17 Claims, 9 Drawing Sheets

(56) References Cited

U.S. PATENT DOCUMENTS

| | | | |
|---|---|---|---|
| 2011/0009199 A1* | 1/2011 | Yamauchi | B60B 27/0026 464/106 |
| 2011/0011203 A1* | 1/2011 | Yamamoto | B60K 7/0007 74/606 A |
| 2011/0209938 A1* | 9/2011 | Basadzishvili | B60G 3/01 180/305 |
| 2012/0217789 A1* | 8/2012 | Yamamoto | B60G 3/20 301/6.5 |
| 2013/0009450 A1 | 1/2013 | Suzuki et al. | |
| 2013/0276563 A1* | 10/2013 | Kawamura | C10M 135/18 74/89.44 |
| 2013/0284526 A1* | 10/2013 | Kawasaki | B60K 7/0007 180/55 |
| 2013/0284528 A1* | 10/2013 | Kawasaki | B60K 7/0007 180/60 |
| 2013/0333966 A1* | 12/2013 | Bryant | B62K 21/00 180/65.51 |
| 2014/0152076 A1* | 6/2014 | Vogler | B60K 7/0007 301/6.5 |
| 2014/0182954 A1* | 7/2014 | Weber | B60K 17/16 180/65.7 |
| 2014/0238766 A1* | 8/2014 | Hasuda | B60L 15/20 180/233 |
| 2014/0246893 A1* | 9/2014 | Tesar | B60K 7/0007 301/6.5 |
| 2014/0284122 A1* | 9/2014 | Hirata | B60G 3/20 180/65.51 |
| 2014/0300175 A1* | 10/2014 | Takahashi | B60K 7/0007 301/6.5 |
| 2014/0309902 A1* | 10/2014 | Katsuyama | B60T 8/1755 701/70 |
| 2014/0374185 A1* | 12/2014 | Fischer | B60K 6/52 180/253 |
| 2015/0082929 A1* | 3/2015 | Isomura | B60K 1/00 74/331 |

* cited by examiner

ELECTRIC DRIVE MOTOR ASSEMBLY FOR A WHEEL

BACKGROUND

Field of the Invention

The present invention generally relates to an electric drive motor assembly for a wheel. More specifically, the present invention relates to a drive assembly for a wheel of a vehicle having an electric traction battery.

Background Information

Several different electric motor arrangements exist to drive wheels of an electric vehicle. One example is a center-mounted motor disposed between a pair of wheels to drive both wheels. The center-mounted motor occupies a large volume because it is centrally disposed and requires drives shafts extending outwardly to each wheel, thereby occupying a majority of the space between the wheels. Further, because of this space inefficiency, the center-mounted motor is not conducive to providing a four-wheel drive vehicle. Similar to the center-mounted motor is an offset center-mounted motor in which the motor axis is offset from the rotation axis of the two wheels being driven. The same disadvantages of the center-mounted motor are associated with the offset center-mounted motor.

Another conventional motor used to drive wheels of an electric vehicle is a wheel hub motor, which is directly connected to a wheel hub such that a drive shaft is not required. Although space is saved with the configuration of the wheel hub motor, the unsprung mass is increased because the wheel hub motor is not supported by the vehicle's suspension. Due to the increased unsprung mass, the vehicle's ride and handling ability is lessened. Additionally, as the rotational mass of the wheel increases, more energy is required to overcome inertia and rotate the tires or to stop rotation of the tires. Moreover, the larger unsprung mass results in passengers experiencing a bumpier ride because the unsprung mass is not supported by the vehicle's suspension.

Further, because more energy is required to rotate and stop the tires, a larger motor is required. However, due to the wheel hub motor being disposed in the wheel hub, reduction gear assemblies cannot typically be used to reduce the size and necessary output of the required motor.

An offset wheel hub motor is similar to the wheel hub motor, except that the motor axis is offset from the rotation axis of the wheel. This arrangement is sometimes deployed to better enable packaging of the brake assembly inside the wheel. The same disadvantages of the wheel hub motor are associated with the offset wheel hub motor.

The electrical connection to a wheel hub or offset wheel hub motor necessarily translates through a large displacement as it must move with the wheel. This requires measures to ensure reliable operation, such as a longer length of wiring and added protection of the wiring from abrasion. Accordingly, a need exists for an improved electric drive motor assembly for a wheel.

SUMMARY

In view of the state of the known technology, one aspect of the present invention is an electric drive motor assembly for a wheel including a wheel hub and an electric motor configured to drive the wheel hub. A drive shaft connects the wheel hub to the electric motor. A pivot member is pivotally connected to the electric motor such that the electric motor is rotatable about the pivot member to accommodate movement of the wheel hub.

Another aspect of the present invention provides a drive assembly for two axially aligned wheels of an electric vehicle including first and second axially spaced wheel hubs. An electric motor assembly is connected to each wheel hub. Each electric motor assembly includes a pivot member and an electric motor configured to drive the wheel hub. A drive shaft connects the wheel hub to the electric motor. The electric motor is rotatable about the pivot member to accommodate movement of the wheel hub.

Yet another aspect of the present invention provides a drive assembly for a four-wheel drive electric vehicle including first and second pairs of axially spaced wheel hubs. An electric motor assembly is connected to each wheel hub. Each electric motor assembly includes a pivot member and an electric motor configured to drive the wheel hub. A drive shaft connects the wheel hub to the electric motor. The electric motor is rotatable about the pivot member to accommodate movement of the wheel hub.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
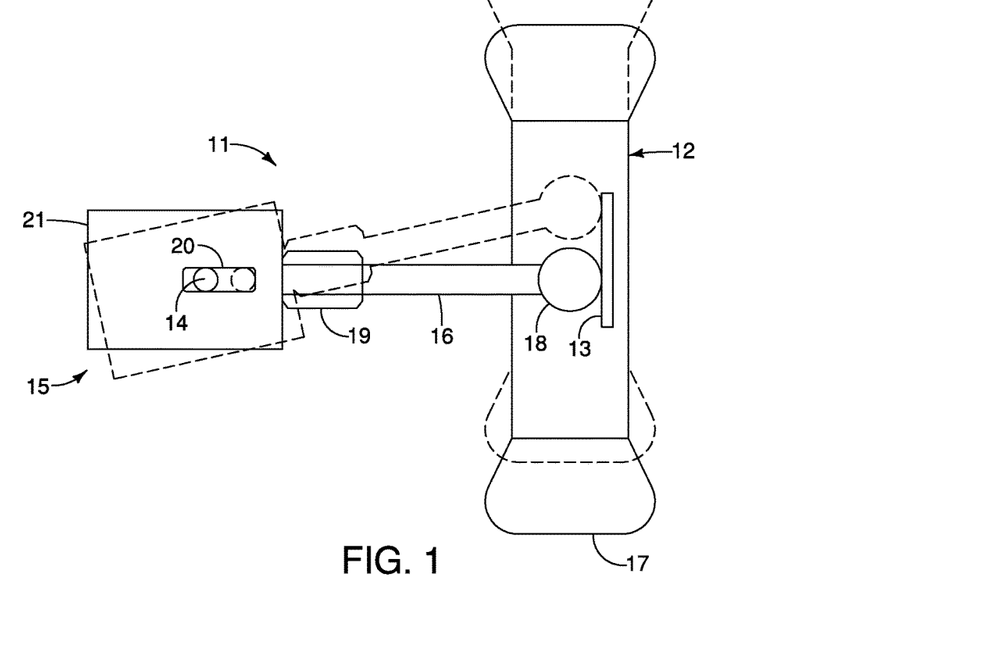
FIG. 1 is a rear elevational view of an electric drive motor assembly for a wheel in accordance with an exemplary embodiment of the present invention.

As shown in FIG. 1, an electric drive motor assembly 11 for a wheel 12 in accordance with an exemplary embodiment of the present invention includes a wheel hub 13, a pivot member 14, an electric motor 15 configured to drive the wheel hub, and a drive shaft 16 connecting the wheel hub 13 to the electric motor 15. The electric motor 15 is rotatable about the pivot member 14 to accommodate movement of the wheel hub 13.

The wheel 12 is connected to the wheel hub 13 by conventional means and a tire 17 is mounted to the wheel 12. A constant velocity (CV) joint 18 joins the drive shaft 16 to the wheel hub 13 and is configured to transfer rotation of the drive shaft 16 to the wheel hub 13, thereby driving the wheel 12.

The electric motor 15 is electrically connected to a battery (not shown) for powering the motor. The drive shaft 16 is rotatably connected to the electric motor 15 such that the electric motor 15 can rotate the drive shaft 16. As shown in FIG. 1, the electric motor 15 is spaced from the wheel 12, thereby reducing the unsprung mass of the vehicle. As described below, the electric motor 15 is connected to a support member, such as a sub-frame, and, thus, to the vehicle's suspension such that the electric motor 15 is sprung mass. Further, the electric motor 15 can act as a counterweight to the wheel 12, thereby further reducing the unsprung mass.

The pivot member 14 pivotally connects the electric motor 15 to the support member, such as a frame or sub-frame of the vehicle. The pivot member 14 allows the electric motor 15 to accommodate movement of the drive shaft 16 and the wheel 12. To further accommodate movement of the drive shaft 16 and the wheel 12, a spline 19 can be disposed on the drive shaft 16 and/or the pivot member 16 can be received by a slot 20 in a motor housing 21. The spline 19 accommodates lateral movement of the drive shaft 16. The slot 20 preferably extends axially in the motor housing 21 to slidably receive the pivot member 14 therein, thereby allowing movement of the pivot member within the slot.

Figure 2:
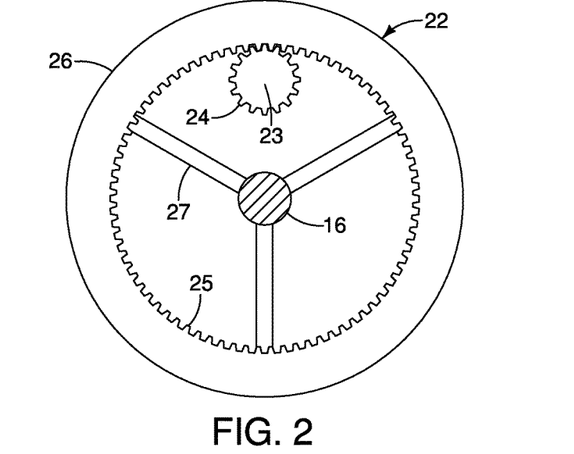
FIG. 2 is a side elevational view of a ring gear assembly disposed between an electric motor and a wheel assembly of FIG. 1.
Figure 3:
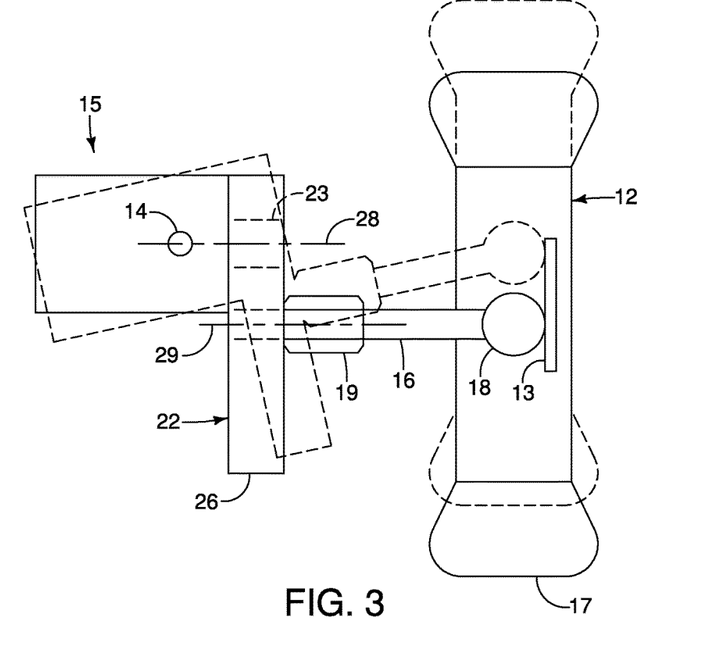
FIG. 3 is a rear elevational view of the electric drive motor assembly of FIG. 1 with the ring gear assembly of FIG. 2 disposed between the electric motor and the wheel assembly.
Figure 5:
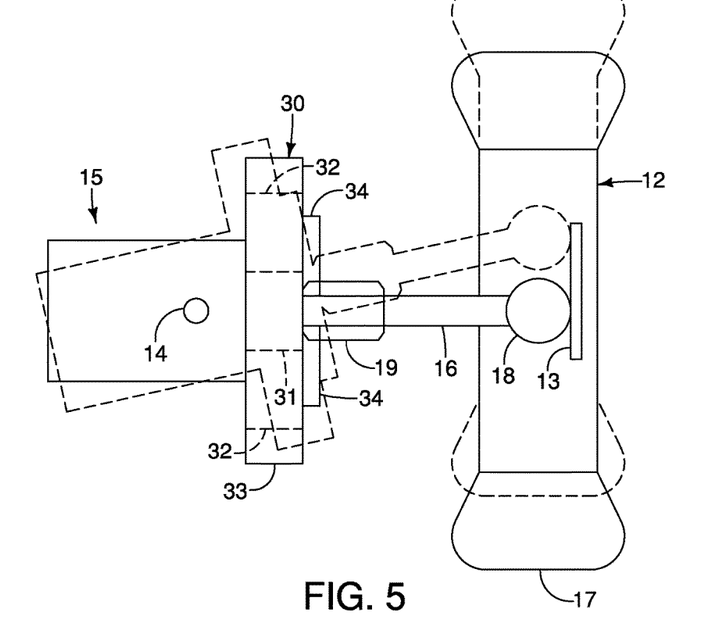
FIG. 5 is a side elevational view of the electric drive motor assembly of FIG. 1 with the planetary gear assembly of FIG. 2 disposed between the electric motor and the wheel assembly.

As shown in FIGS. 3 and 5, a gear assembly can be disposed between the electric motor 15 and the drive shaft 16 to reduce the size of the motor while achieving the same wheel torque. Space for the gear assembly is obtained by spacing the motor 15 from the wheel hub 13. An exemplary gear assembly is a ring gear assembly 22, as shown in FIGS. 2 and 3. A plurality of teeth 24 are circumferentially spaced about an outer surface of an output shaft 23 of the electric motor 15 and are configured to engage a plurality of teeth 25 circumferentially spaced about an inner surface of a ring gear 26, as shown in FIG. 2. The drive shaft 16 is connected to the gear ring 26 by a plurality of connecting arms 27. The engagement between the teeth 24 of the output shaft 23 and the ring gear teeth 25 causes rotation of the ring gear 26 when the output shaft 23 rotates. The drive shaft 16 is rotated by rotation of the ring gear 26 due to the connection therebetween. As shown in FIG. 3, a rotational axis 28 of the motor output shaft 23 is spaced from a rotational axis 29 of the drive shaft 16.

Figure 4:
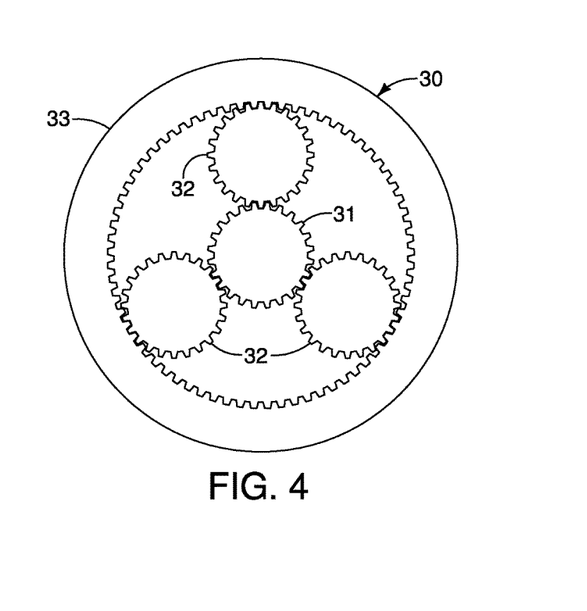
FIG. 4 is a side elevational view of a planetary gear assembly disposed between an electric motor and a wheel assembly of FIG. 1.

Alternatively, a planetary gear assembly 30 can be disposed between the electric motor 15 and the drive shaft 16, as shown in FIGS. 4 and 5. A motor output shaft 31 engages a plurality of outer gears 32 to rotate the drive shaft 16. A plurality of teeth are circumferentially disposed on an outer surface of the motor output shaft 31 to engage a plurality of teeth circumferentially disposed on outer surfaces of the outer gears 32. A plurality of teeth is circumferentially disposed on an inner surface of a fixed gear 33. Rotation of the motor output shaft 31 causes rotation of the outer gears 32, which rotate about the motor output shaft 31 and engage the fixed gear 33. Connecting arms 34 connect the outer gears 32 to the drive shaft 16 such that rotation of the outer gears 32 causes rotation of the drive shaft 16.

Figure 6:
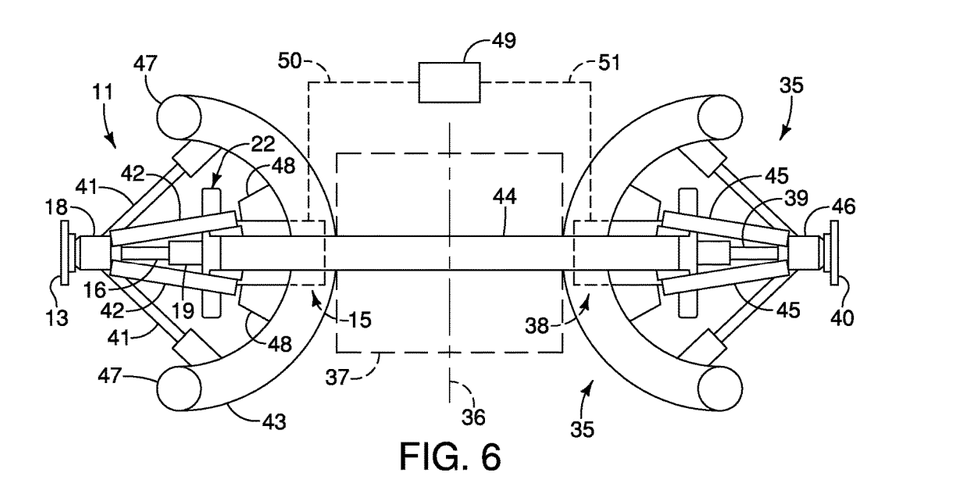
FIG. 6 is a plan view of the electric drive motor assembly of FIG. 5 for two axially aligned wheels.

An exemplary configuration of the electric drive motor assembly 11 for two axially aligned wheels (e.g., two front wheels or two rear wheels) is shown in FIG. 6. A second electric drive motor assembly 35 is symmetrically disposed on an opposite side of a vehicle centerline 36. Substantial space 37 is provided between the electric motors 15 and 38 for mounting of an inverter, motor controller, charger, or any other suitable component. The motors 15 and 36 are axially spaced from each other such that the drive shafts 16 and 39 are coaxial. The motors 15 and 36 independently drive the drive shafts 16 and 39, thereby independently driving the wheel hubs 13 and 40.

Figure 17:
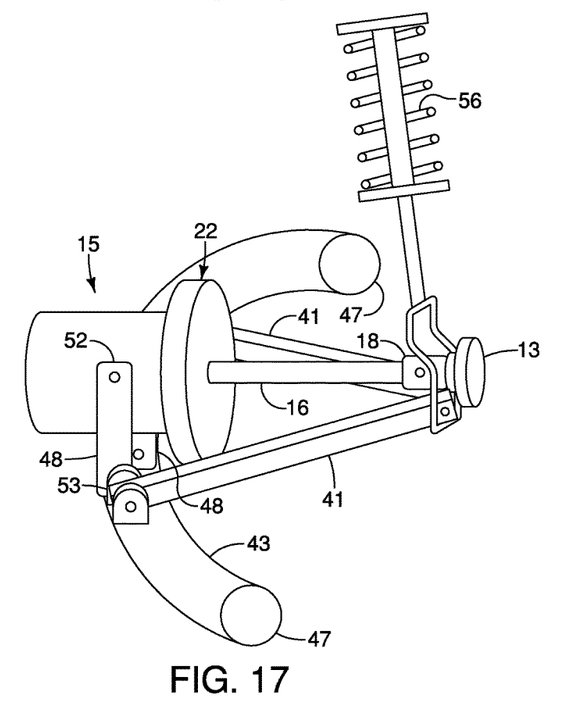
FIG. 17 is a perspective view of the electric drive motor assembly of FIG. 12 in which the motor is connected to a frame of the vehicle.

A plurality of suspension links 41 and 42 are connected to the CV joint 18, as shown in FIG. 6. A pair of first suspension links 41 are connected between the CV joint 18 and a sub-frame 43. A pair of second suspension links 42 is connected between the CV joint 18 and a sub-frame cross member 44. The pair of second suspension links 42 is preferably disposed between the pair of first suspension links 41. The second electric drive motor assembly 35 is configured in a substantially similar manner to the first electric drive motor assembly 11. A pair of second suspension links 45 connect a CV joint 46 of the second electric drive assembly 35 to the sub-frame cross member 44. Suspension arms 47 connect the sub-frame 43 to the vehicle frame. The suspension arms 47 are preferably disposed at opposite ends of the sub-frame, as shown in FIGS. 6 and 17.

As shown in FIG. 6, the pivot member 14 includes link arms 48 pivotally connecting the electric motor 15 to the sub-frame 43. Each of the link arms 48 is pivotally connected to one side of the motor 15 at a first end 52, as shown in FIG. 17. Second ends 53 of the link arms 48 are pivotally connected to the sub-frame 43.

A control module 49 can be electrically connected to electric motors 15 and 38 to manage the torque distributed to each of the wheel hubs 13 and 40. The control module 41 is electrically connected through electrical connections 50 and 51 to the motors 15 and 38 such that the torque distribution is electrically controlled without any mechanical linkages. The control of torque distribution can be almost instantaneous and exact, which provides a measure of control not provided by internal combustion engine vehicles.

Figure 7:
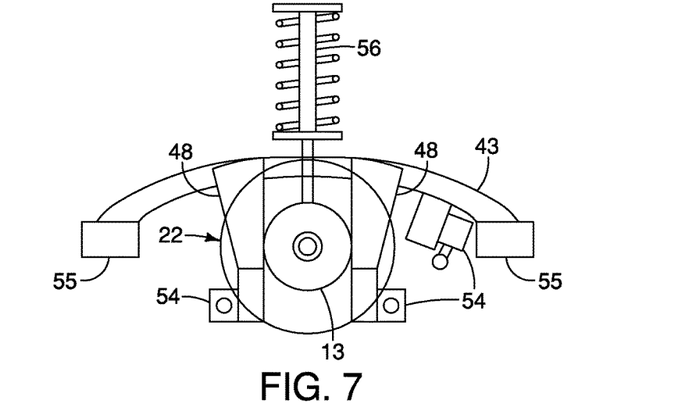
FIG. 7 is a side elevational view of the electric drive motor assembly of FIG. 3 for front wheels of an electric vehicle.
Figure 8:
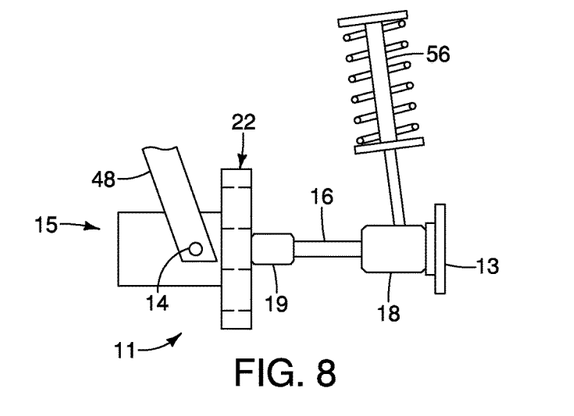
FIG. 8 is a rear elevational view of the electric drive motor assembly of FIG. 7.
Figure 9:
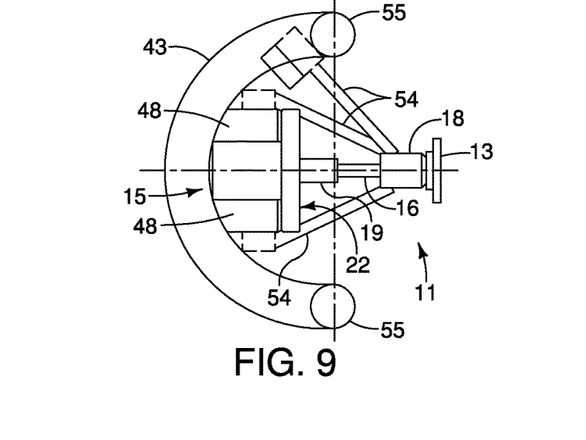
FIG. 9 is a plan view of the electric drive motor assembly of FIG. 7.

An exemplary configuration of the electric drive motor assembly 11 for front wheels (e.g., with a front strut suspension) is shown in FIGS. 7-9. A plurality of, suspension links 54 are connected between the CV joint 18 and the sub-frame 43. Suspension arms 55 are connected between the sub-frame 43 and the vehicle frame. Preferably, the suspension arms 55 are disposed at opposite ends of the sub-frame 43. The pivot member 14 includes link arms 48 extending between the electric motor 15 and the sub-frame 43. Preferably, the ends of the link arms 48 are pivotally connected to the electric motor 15 and the sub-frame 43, thereby allowing movement of the electric motor to accommodate movement of the wheel hub 13. A suspension member 56 connects the CV joint 18 to the vehicle frame.

Figure 10:
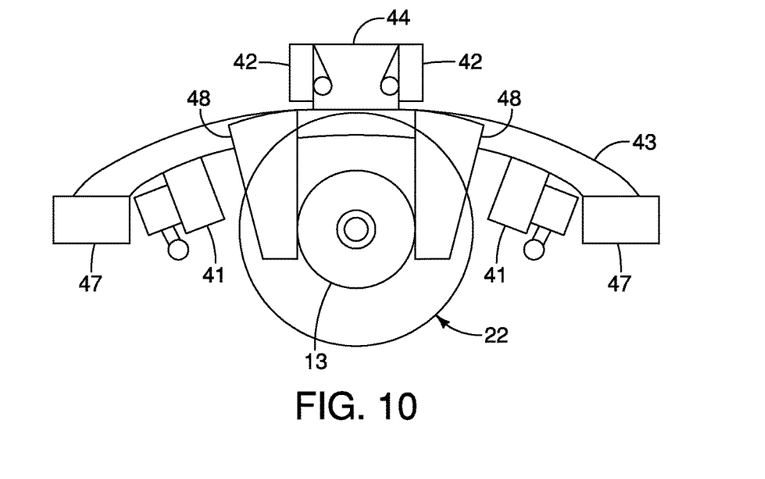
FIG. 10 is a side elevational view of the electric drive motor assembly of FIG. 3 for rear wheels of an electric vehicle.
Figure 11:
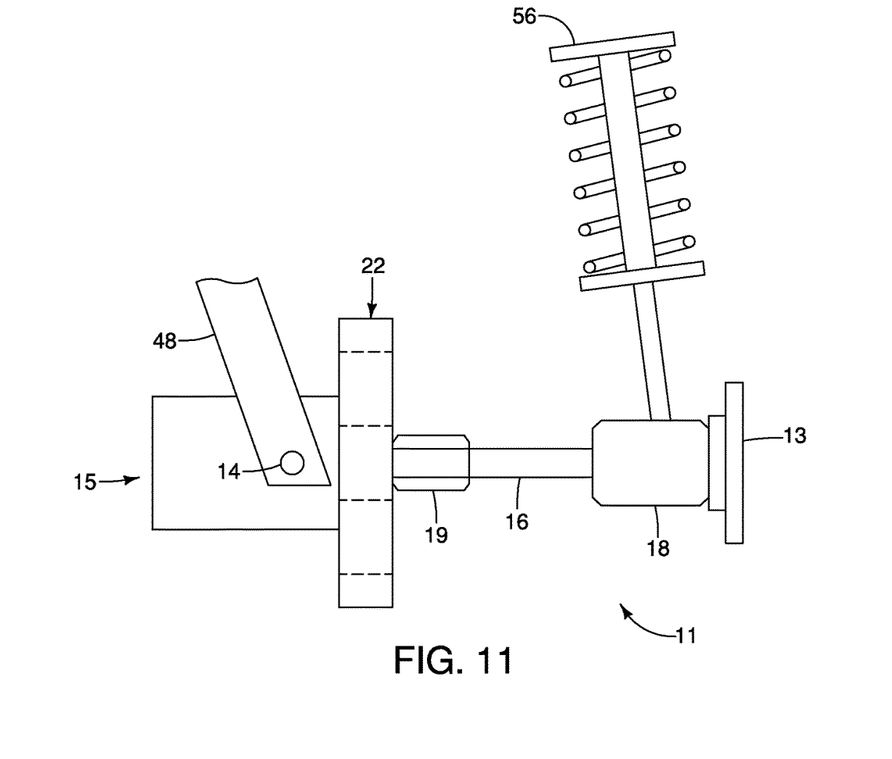
FIG. 11 is a rear elevational view of the electric drive motor assembly of FIG. 10.
Figure 12:
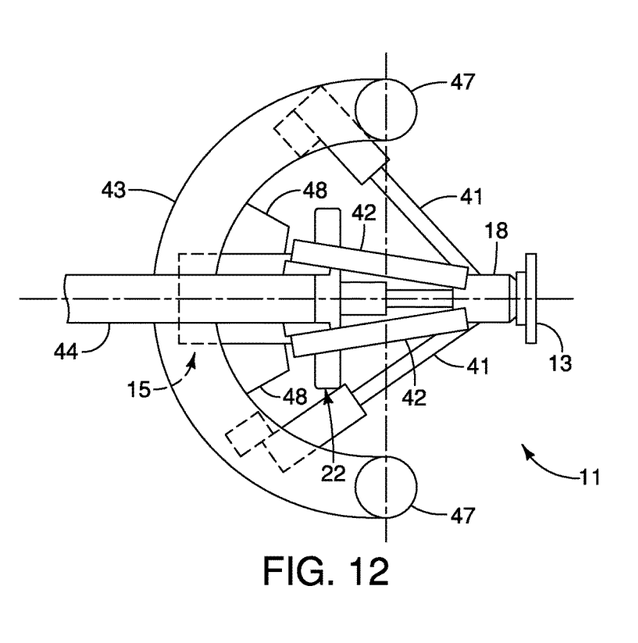
FIG. 12 is a plan view of the electric drive motor assembly of FIG. 10.

An exemplary configuration of the electric drive motor assembly 11 for rear wheels (e.g., with a rear multi-link suspension) is shown in FIGS. 10-12. The configuration is substantially similar to that of the front-wheel drive vehicle shown in FIGS. 7-9. A suspension member 56 can connect the CV joint 18 to the vehicle frame.

Figure 13:
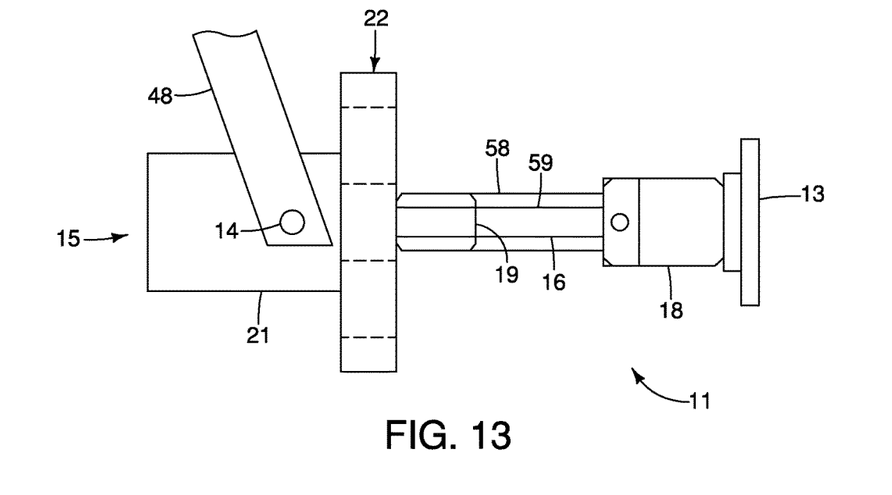
FIG. 13 is a side elevational view of a linking member for a drive shaft of the electric drive motor assembly of FIG. 5.

A linking member 58 can be connected between the electric motor 15 and the CV joint 18, as shown in FIG. 13. When a gear assembly is not used, the linking member 58 is directly connected to the motor housing 21. When a gear assembly is used, such as the planetary gear 22, the linking member 58 is directly connected to the gear assembly. The other end of the linking member 58 is connected to the CV joint 18 in any suitable manner, such as with a pivot or universal joint. The linking member 58 is preferably a substantially C-shaped member in cross-section such that the linking member has an axially extending opening 59 extending between the planetary gear 22 and the CV joint 18, as shown in FIG. 13. The linking member 58 connects the motor 15 to the wheel hub 13 such that the mass of the electric motor 15 acts as a counterweight to the unsprung mass of the wheel 12, thereby minimizing the overall unsprung mass of the vehicle to improve handling and steering. The axially extending opening 59 in the linking member allows for flexing or vibrating of the drive shaft 16. The axially extending opening 59 can face any direction about the axis of the drive shaft 16, such as downward.

Figure 14:
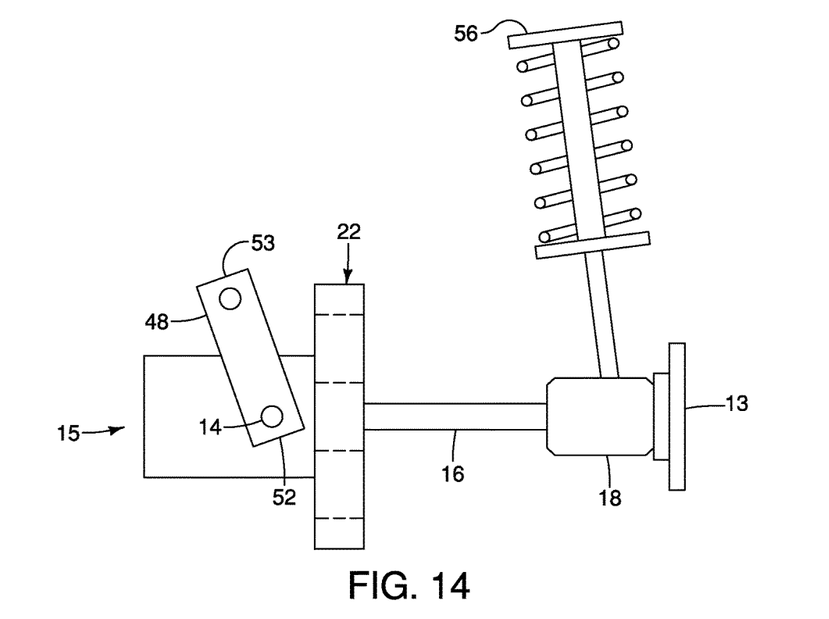
FIG. 14 is a rear elevational view of the electric drive motor assembly of FIG. 5 including a linking arm connected to the electric motor.

The pivot member 14 of the electric motor 15 preferably includes a link arm 48. Preferably, two link arms are connected between the electric motor 15 and a support member. A first end 52 of each link arm 48 is pivotally connected to the electric motor 15. The second end 53 of each link arm 48 is pivotally connected to the support member, such as the sub-frame 43 as shown in FIG. 17. Preferably, the first ends 52 of the link arms 48 are pivotally connected to substantially opposite sides of the electric motor 15. The first ends 52 of the link arms 48 are pivotally connected to the electric motor 15 at a position substantially on the rotational axis of the drive shaft 16.

Figure 15:
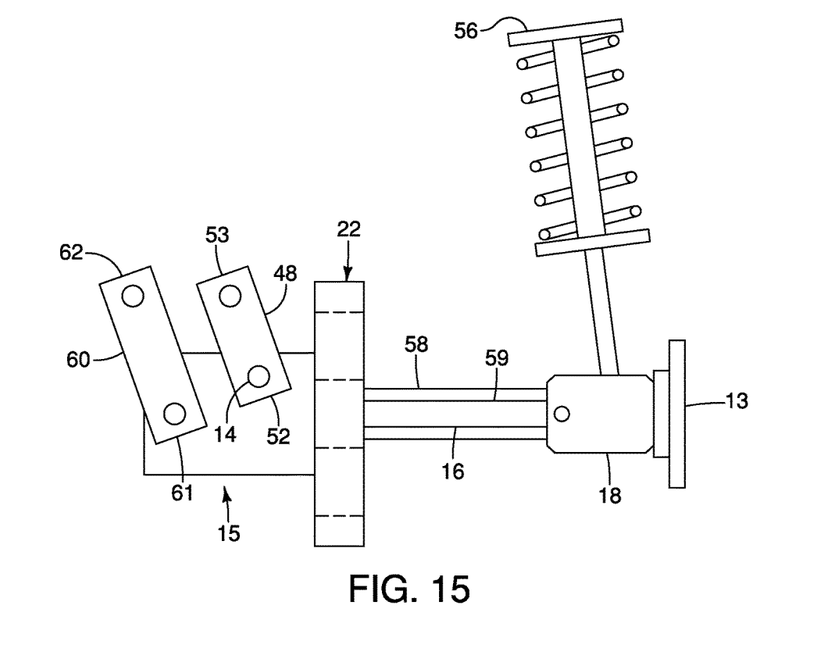
FIG. 15 is a rear elevational view of the electric drive motor assembly of FIG. 5 including multiple linking arms connected to the electric motor.
Figure 16:
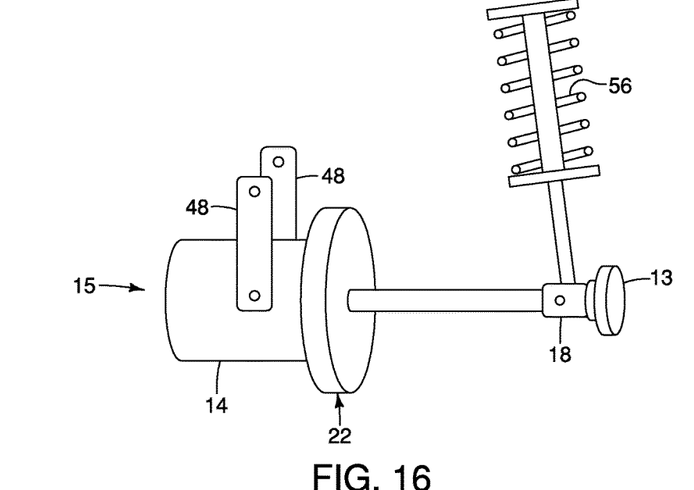
FIG. 16 is a perspective view of the electric drive motor assembly of FIG. 14.

Alternatively, as shown in FIG. 15, four link arms are connected between the electric motor 15 and the support member. Two first link arms 48 are connected to the electric motor 15 above the rotational axis of the drive shaft 16, and the two second link arms 60 are connected to the electric motor 15 below the rotational axis of the drive shaft 16. The first ends 52 and 61 of the link arms 48 and 60 are pivotally connected to the electric motor 15. The second ends 53 and 62 of the link arms 48 and 60 are pivotally connected to the support member, such as the sub-frame 43. One pair of the first and second link arms 48 and 60 is disposed on each side of the electric motor 15. Offsetting the pivotal connections of the first and second link arms 48 and 60 from the rotational axis of the drive shaft 16 allows the link arms to locate the center of the wheel 12.

Figure 18:
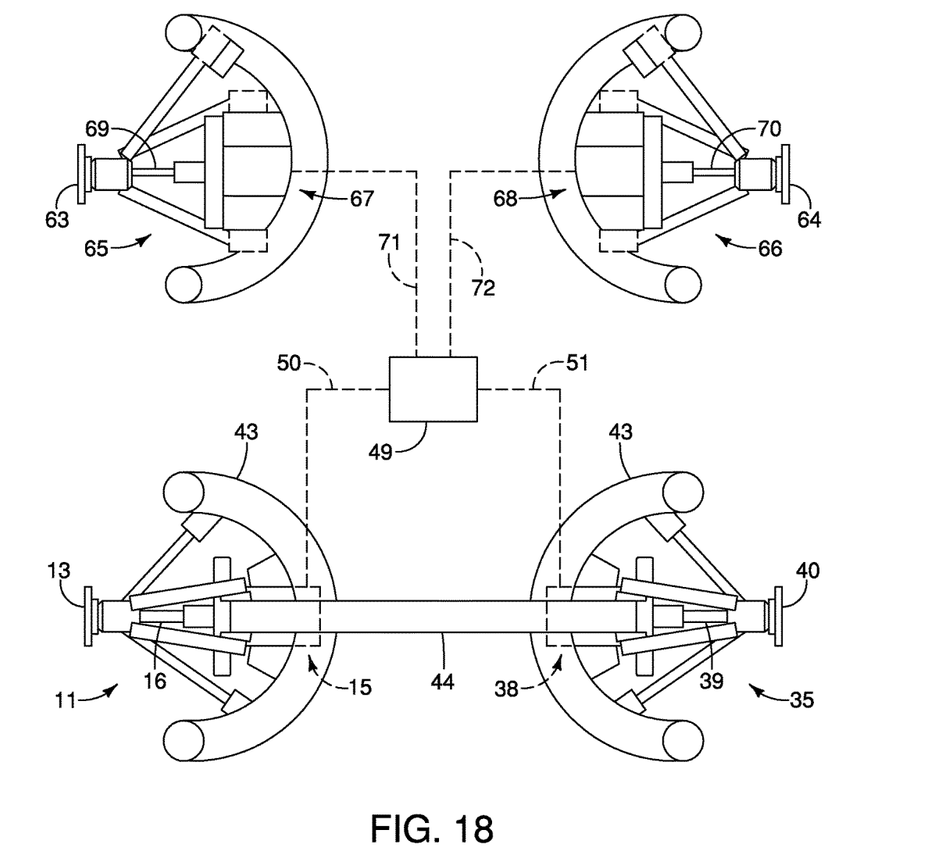
FIG. 18 is a plan view of the electric drive motor assembly for a four-wheel drive electric vehicle.

An exemplary configuration of the electric motor drive assembly for a four-wheel drive vehicle is shown in FIG. 18. The electric motor drive assembly is substantially similar to a combination of the rear-wheel drive configuration of FIGS. 6 and 10-12 and the front wheel configuration of FIGS. 7-9. Each of the wheel hubs 13, 40, 63 and 64 has an independent electric drive assembly 11, 35, 65 and 66. Each of the motors 15, 38, 67 and 68 is spaced from and connected to its respective wheel hub by a drive shaft 16, 39, 69 and 70, respectively. The axial spacing of the motors from their respective wheel hubs allows gear assemblies to be disposed between the motors and their respective wheel hubs. The control module 49 is electrically connected to each of the electric motors 15, 38, 67 and 68 by a respective electrical connection 50, 51, 71 and 72. The control module 49 manages the torque distributed to each of the wheel hubs 13, 40, 63 and 64 by the motors to provide substantially instant and exact control.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An electric drive motor assembly for a wheel, comprising:
   a wheel hub;
   an electric motor configured to drive the wheel hub;
   a drive shaft connecting the wheel hub to the electric motor;
   a pivot member pivotally connected to the electric motor such that the electric motor is rotatable about the pivot member to accommodate movement of the wheel hub, the electric motor being pivotable with respect to the wheel hub about an axis through the pivot member, the axis being substantially perpendicular to the drive shaft, and a rotational axis of the drive shaft passing through the pivot member and being substantially parallel with a wheel hub rotational axis; and
   the pivot member further including a first link arm pivotally connected to a side of the motor, a first end of the first link arm being pivotally connected to the motor and a second end of the first link arm being configured to be pivotally connected to a vehicle frame.

2. The electric drive motor assembly according to claim 1, further comprising
   a gear assembly disposed between the electric motor and the drive shaft.

3. The electric drive motor assembly according to claim 2, wherein the gear assembly is a ring gear assembly.

4. The electric drive motor assembly according to claim 2, wherein the gear assembly is a planetary gear assembly.

5. The electric drive motor assembly according to claim 1, wherein a second link arm is spaced apart from the first link arm, first ends of the link arms being pivotally connected to a common side of the motor and second ends of the link arms being configured to be pivotally connected to the vehicle frame.

6. The electric drive motor assembly according to claim 1, further comprising
   a spline member disposed between the electric motor and the drive shaft and configured to accommodate lateral movement of the drive shaft.

7. The electric drive motor assembly according to claim 1, further comprising
   a substantially C-shaped linking member disposed between the electric motor and the wheel hub, the linking member receiving the drive shaft therein.

8. A drive assembly for two axially aligned wheels of an electric vehicle, comprising:
   first and second axially spaced wheel hubs;
   an electric motor assembly connected to each wheel hub, each electric motor assembly including
      an electric motor configured to drive the wheel hub;
      a drive shaft connecting the wheel hub to the electric motor;
      a pivot member pivotally connected to the electric motor such that the electric motor is rotatable about the pivot member to accommodate movement of the wheel hub, the electric motor being pivotable with respect to the wheel hub about an axis through the pivot member, the axis being substantially perpendicular to the drive shaft, and a rotational axis of the drive shaft passing through the pivot member and being substantially parallel with a wheel hub rotational axis; and
   the pivot member further including a first link arm pivotally connected to a side of the motor, a first end of the first link arm being pivotally connected to the motor and a second end of the first link arm being configured to be pivotally connected to a vehicle frame.

9. The drive assembly according to claim 8, wherein the electric motors are axially spaced from each other.

10. The drive assembly according to claim 8, wherein each electric motor assembly further comprises
   a gear assembly disposed between the electric motor and the drive shaft.

11. The drive assembly according to claim 8, wherein
   a second link arm is spaced apart from the first link arm, first ends of the link arms being pivotally connected to a common side of the motor and second ends of the link arms being configured to be pivotally connected to the vehicle frame.

12. The drive assembly according to claim 8, wherein each electric motor assembly further comprises
   a substantially C-shaped linking member disposed between the electric motor and the wheel hub, the linking member receiving the drive shaft therein.

13. The drive assembly according to claim 11, wherein the first ends of the link arms on each side of the motor are offset in an axial direction of the motor.

14. A drive assembly for a four-wheel drive electric vehicle, comprising:
   first and second pairs of axially spaced wheel hubs;
   an electric motor assembly connected to each wheel hub, each electric motor assembly including
      an electric motor configured to drive the wheel hub;
      a drive shaft connecting the wheel hub to the electric motor;
      a pivot member pivotally connected to the electric motor such that the electric motor is rotatable about the pivot member to accommodate movement of the wheel hub, the electric motor being pivotable with respect to the wheel hub about an axis through the pivot member, the axis being substantially perpendicular to the drive shaft, and a rotational axis of the drive shaft passing through the pivot member and being substantially parallel with a wheel hub rotational axis; and
   the pivot member further including a link arm pivotally connected to a side of the motor.

15. The drive assembly according to claim 14, wherein the electric motors are axially spaced from each other for each pair of axially spaced wheel hubs.

16. The drive assembly according to claim 14, each electric motor assembly further comprising
   a gear assembly disposed between at least one of the electric motors and a corresponding one of the drive shafts.

17. An electric drive motor assembly for a wheel, comprising:
   a wheel hub;
   an electric motor configured to drive the wheel hub;
   a drive shaft connecting the wheel hub to the electric motor; and
   a pivot member pivotally connected to the electric motor such that the electric motor is rotatable about the pivot member to accommodate movement of the wheel hub, the electric motor being pivotable with respect to the wheel hub about an axis through the pivot member, the axis being substantially perpendicular to the drive shaft, and a rotational axis of the drive shaft passing through the pivot member and being substantially parallel with a wheel hub rotational axis, an axially extending slot in a housing of the electric motor slidably receiving the pivot member therein.

* * * * *